United States Patent

Martin et al.

[11] Patent Number: 5,950,548
[45] Date of Patent: Sep. 14, 1999

[54] PROCESS FOR BURNING COMBUSTIBLES, IN PARTICULAR GARBAGE

[75] Inventors: Johannes J. E. Martin, Munich; Michael Zahlten, Hamburg, both of Germany

[73] Assignee: Martin GmbH fuer Umwelt-und Energietechnik, Munich, Germany

[21] Appl. No.: 08/385,668

[22] Filed: Feb. 8, 1995

[30] Foreign Application Priority Data

Feb. 11, 1994 [DE] Germany .............................. 44 04 418

[51] Int. Cl.$^6$ ...................................................... F23G 7/00
[52] U.S. Cl. ...................... 110/346; 110/259; 110/165 A; 588/256
[58] Field of Search ................................. 110/346, 259, 110/165 A, 165 R; 588/256

[56] References Cited

U.S. PATENT DOCUMENTS

| | | |
|---|---|---|
| 4,300,460 | 11/1981 | Lamb . |
| 4,953,477 | 9/1990 | Martin .............................. 110/346 X |
| 5,078,065 | 1/1992 | Tsunemi et al. ................. 110/165 R X |
| 5,161,471 | 11/1992 | Piekos .................................. 110/165 R |
| 5,259,863 | 11/1993 | Schneider et al. . |
| 5,320,050 | 6/1994 | Ishida et al. ......................... 110/165 R |
| 5,493,578 | 2/1996 | Fukusaki et al. ................ 110/165 R X |

FOREIGN PATENT DOCUMENTS

| | | |
|---|---|---|
| 344304B | 7/1978 | European Pat. Off. . |
| 0427230A2 | of 1990 | European Pat. Off. . |
| 0427231A2 | 11/1990 | European Pat. Off. . |
| 0667490B1 | 1/1995 | European Pat. Off. . |
| 3512810A1 | 4/1985 | Germany . |
| 3937866A1 | 11/1989 | Germany . |
| 4404418C2 | 2/1994 | Germany . |

OTHER PUBLICATIONS

K.–H Thomen, Planung, Bau Und Betrieb des 6. Kessel der Mullverbrennungsanlage Dusseldorf, Jul. 1984, 643–648.

G. Schetter und E. Leitmeir, Umweltvertraglichkeit der thermischen Abfallverwertung, Feb. 1987, 128–138.

Japanese Patent Abstract published by JAPIO, Appl. No. 4–5087.

Primary Examiner—Henry Bennett
Assistant Examiner—Marc Norman
Attorney, Agent, or Firm—McAulay Nissen Goldberg Kiel & Hand, LLP

[57] ABSTRACT

In the process for burning combustibles, in particular garbage and refuse, on a furnace grate, the combustion regulation on the furnace grate is carried out in such a way that the ash developing at the end of the furnace grate has a temperature lying just below the melting point of the ash. The combustion regulation is preferably monitored by an infrared camera and influenced appropriately. In order to achieve the desired temperature, the combustion air is advantageously mixed with oxygen and/or preheated.

4 Claims, 1 Drawing Sheet

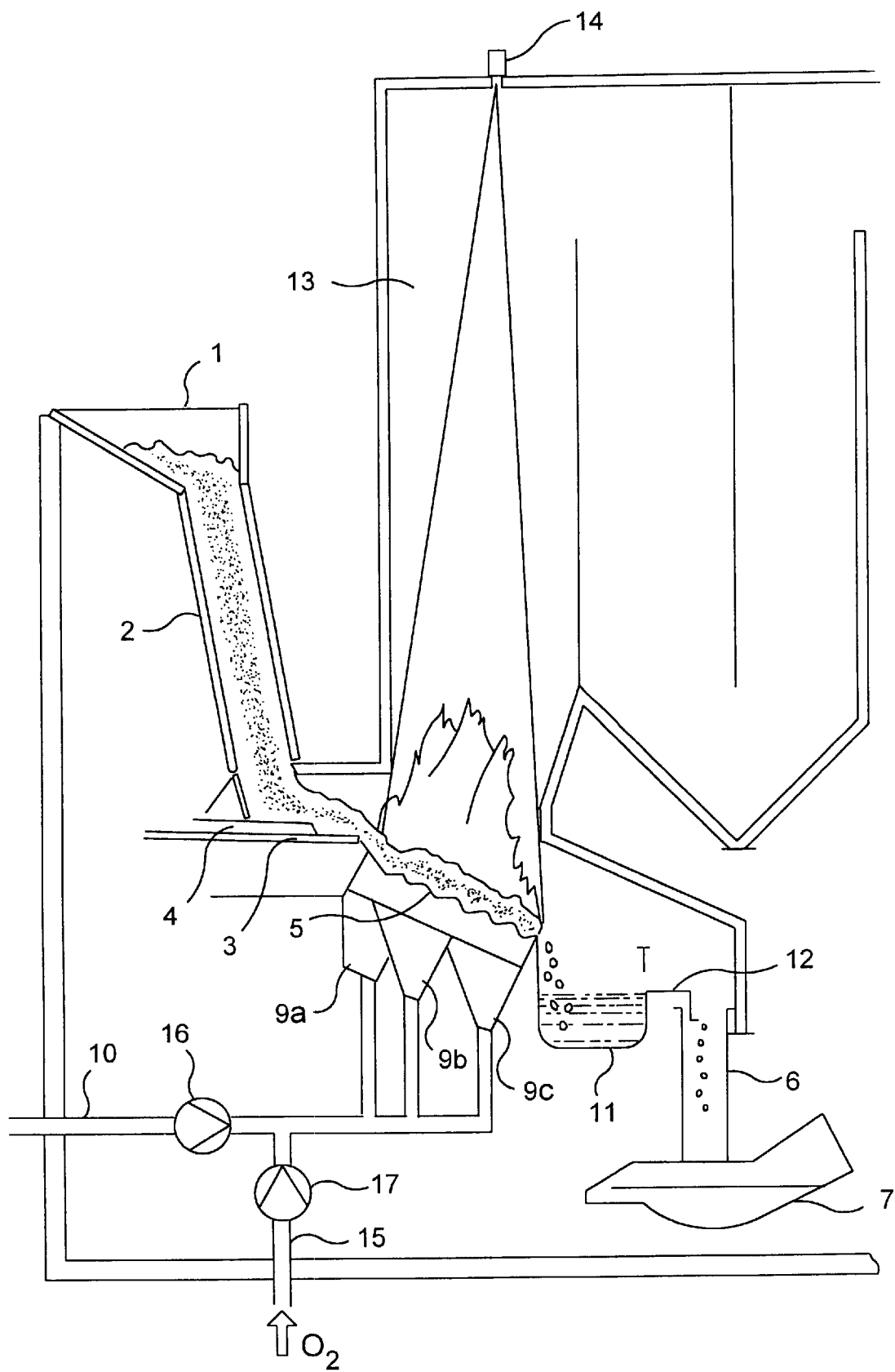

PROCESS FOR BURNING COMBUSTIBLES, IN PARTICULAR GARBAGE

BACKGROUND OF THE INVENTION a) Field of the Invention

The invention is directed to a process for burning combustibles, in particular garbage and refuse, on a furnace grate in which the combustible is dried, ignited and burned and the ash is additionally heated and melted in a subsequent melting stage by external energy and then discharged.

b) Description of the Related Art

In a known process of this type (DE 39 37 866 A1), the ash is heated and melted by external burners in the region of the burnout stage in which the ash already has a relatively low temperature since the combustible is almost completely burned out. In so doing, it is necessary to heat the ash to a temperature of approximately 1,400° C., since it still contains only small components of combustible material and is accordingly already considerably cooled. This requires a very high expenditure of energy by the external burners.

OBJECT AND SUMMARY OF THE INVENTION

The primary object of the present invention is an extensive reduction in the external energy required for melting the ash.

According to the invention, this object is met in a process of the type mentioned above by means of a combustion regulation on the furnace grate which results in a heating of the burning up combustible material until just below the melting point of the developing ash before reaching the melting stage. The combustion regulation or combustion control is carried out in such a way that the combustible, upon entering the melting stage, is already virtually at melting temperature so that the external energy needed to achieve the melting process is substantially reduced. Due to the risk of destruction of the furnace grate, the combustible must be maintained below the melting temperature of the ash before entering the melting stage, since otherwise the molten ash would not only lead to an overheating of the grate bars forming the furnace grate but would also result in impairment or blockage of the grate bar movement. Accordingly, the quality of the ash is improved and any pollutants still remaining are either embedded in the matrix of the ash core such that they can no longer be extracted or are converted to the gaseous phase and subjected to known treatment processes.

In order to safely rule out destruction of the furnace grate by developing molten ash, the ash forming from the burning up combustibles is advisably heated to approximately 50 to 100° C. below the melting temperature of the ash prevailing in the medium.

The combustion regulation can advantageously include oxygen enrichment of the combustion air. In this respect, it is advantageous that the combustion regulation can also include preheating of the combustion air.

In another advantageous construction of the invention, the combustion regulation is monitored by at least one infrared camera so that it is possible to design the combustion regulation or combustion control for optimal combustion states on the furnace grate at all times. That is, this monitoring allows the combustion control to be manipulated by supplying oxygen-enriched combustion air or preheated combustion air so as to ensure that the desired combustibles temperature below the melting point of the ash will be reached before entering the melting stage.

BRIEF DESCRIPTION OF THE DRAWINGS

In the following, the invention is explained by way of example with reference to a furnace plant which is shown schematically in the drawing. The only drawing shows a longitudinal section through a furnace plant.

DESCRIPTION OF THE PREFERRED EMBODIMENTS

The combustible to be burned, in particular garbage, is fed to the front end of an inclined furnace grate 5 via a charging hopper 1, a charging chute 2 and a feed table 3 on which charging pistons 4 execute a reciprocating motion and is moved to the rear end of the furnace grate 5 by the stoking movements of the grate steps formed by the individual grate bars. In the conventional combustion process, the combustible in the region of the charging zone is first dried and ignited and then set in intensive burnup until finally the burnt-out ash falls off the end of the furnace grate into an ash drop chute 6, an ash discharger 7 filled with water being arranged at the lower end of the latter. The air required for combustion is fed to the combustible from below via individual underfire air zones $9a$ to $9c$ via a combustion air feedline 10. In so doing, enough air is supplied in the rear region of the furnace grate through the underfire air zone $9c$ so that the ash which is almost completely burned out is cooled very extensively before transfer to the ash drop chute 6.

In contrast to the known process which has just been described, the combustion regulation on the furnace grate in the process according to the invention is carried out by the various steps to be described in the following in such a way that the temperature of the ash developing at the end of the furnace grate from the burning up combustible is just below the melting point of the developing ash, for example, approximately 50 to 100° C. below the given melting temperature of the ash. The ash which is heated in this way does not then fall into an ash drop chute 6 as was effected in previous processes, but falls first into a melting crucible 11 in which the ash is liquified by external energy. The molten ash then arrives in the ash drop chute 6 via an overflow 12.

In order to reach this state, the quantity of combustion air and its distribution in the longitudinal direction and possibly also in the transverse direction of the furnace grate is adjusted in a suitable manner and the combustion process is monitored by an infrared camera 14 which is preferably arranged at the upper end of the exhaust gas flue 13. With the aid of this infrared camera an accurate picture of the burnup behavior of the combustibles on the furnace grate is obtained so that the necessary regulating steps can be implemented based on the picture supplied by the infrared camera and on the temperature distributions shown in the picture. In particular, it must be ensured that the ash does not cool off as was previously the case, but rather is maintained at the desired temperature level. In order to achieve this objective, the combustion air is preferably mixed with pure oxygen via an oxygen line 15, indicated schematically, which opens into the combustion air feedline 10. Suitable regulating members 16 and 17 are provided in the combustion air feedline 10 and in the oxygen line 15 for adjusting the appropriate oxygen content. Depending on the composition of the combustible to be burned, it may also be advantageous to preheat the supplied combustion air by means of an air preheater, not shown.

While the foregoing description and drawings represent the preferred embodiments of the present invention, it will be obvious to those skilled in the art that various changes and modifications may be made therein without departing from the true spirit and scope of the present invention.

What is claimed is:

1. In a process for burning combustibles on a furnace grate in which the combustible is dried, ignited and burned and the ash is additionally heated and melted in a subsequent melting stage by external energy and then discharged, the improvement comprising the step of:

regulating the combustion on the furnace grate such that the combustible being burned up is heated to approximately 50 to 100° C. below the melting point of the occurring ash before reaching the melting stage.

2. The process according to claim 1, wherein the step of regulating the combustion also includes the step of enriching the oxygen of the combustion air.

3. The process according to claim 1, wherein the step of regulating the combustion includes the step of preheating of the combustion air.

4. The process according to claim 1, wherein the step of regulating the combustion includes monitoring by at least one infrared camera.

* * * * *